United States Patent
Anderson (10) Patent No.: US 8,682,573 B2
(45) Date of Patent: Mar. 25, 2014

(54) METHOD OF INITIATING VEHICLE MOVEMENT

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 414 days.

(21) Appl. No.: 12/860,079

(22) Filed: Aug. 20, 2010

(65) Prior Publication Data

US 2012/0046822 A1    Feb. 23, 2012

(51) Int. Cl.
*G01C 21/30* (2006.01)
*G06Q 40/00* (2012.01)

(52) U.S. Cl.
USPC .............................................. 701/209; 705/4

(58) Field of Classification Search
USPC ......................................................... 701/209
See application file for complete search history.

(56) References Cited

U.S. PATENT DOCUMENTS

| | | | |
|---|---|---|---|
| 7,079,927 B1 * | 7/2006 | Tano et al. | 701/29.6 |
| 7,415,333 B2 | 8/2008 | Anderson | |
| 7,477,984 B2 * | 1/2009 | Zhang et al. | 701/117 |
| 7,650,239 B2 * | 1/2010 | Samukawa et al. | 701/300 |
| 8,140,358 B1 * | 3/2012 | Ling et al. | 705/4 |
| 8,229,618 B2 * | 7/2012 | Tolstedt et al. | 701/23 |
| 2008/0147253 A1 | 6/2008 | Breed | |
| 2009/0221279 A1 | 9/2009 | Rutledge | |
| 2010/0036594 A1 | 2/2010 | Yamane et al. | |
| 2010/0216509 A1 | 8/2010 | Riemer et al. | |

OTHER PUBLICATIONS

International Preliminary Report on Patentability dated Mar. 7, 2013 regarding application PCT/US2011/048616, applicant Deere & Company et al., 5 pages.
International Search Report & Written Opinion of the International Searching Authority for application No. PCT/US2011/048616, 5 pages.

* cited by examiner

*Primary Examiner* — Garcia Ade
(74) *Attorney, Agent, or Firm* — Yee & Associates, P.C.

(57) ABSTRACT

A method for initiating movement of a mobile machine is provided. In response to determining that the mobile machine needs to move to a new location based on environmental parameters corresponding to a current position of the mobile machine, a safe location for the mobile machine is determined based on the environmental parameters. An estimated time of travel is calculated from the current position of the mobile machine to the safe location based on a selected travel route for the mobile machine. Then, movement of the mobile machine is initiated prior to a first estimated time when the selected travel route will be impassable due to the environmental parameters based on the estimated time of travel using the selected travel route from the current position of the mobile machine to the safe location.

20 Claims, 4 Drawing Sheets

METHOD OF INITIATING VEHICLE MOVEMENT

FIELD OF THE INVENTION

The present invention relates generally to a mobile machine and more particularly to a method, system, and computer usable program code for initiating movement of a vehicle based on environmental parameters.

BACKGROUND OF THE INVENTION

The criticality of disaster relief heightens awareness of the need for managing fleets of vehicles and making decisions quickly. For example, a construction company, which is known for work in disaster relief, may need to be mobilized and on the ground any where in the world in a very short period of time. As a result, this disaster relief construction company needs to keep track of its fleet of vehicles at all times, especially during the crisis situation. In addition, this company needs to be alerted prior to adverse conditions arising, such as predicted flooding, which may cause its fleet of vehicles to be rendered inoperable or unusable.

SUMMARY

An embodiment of the present invention provides a method for initiating movement of a mobile machine. In response to determining that the mobile machine needs to move to a new location based on environmental parameters corresponding to a current position of the mobile machine, a safe location for the mobile machine is determined based on the environmental parameters. An estimated time of travel is calculated from the current position of the mobile machine to the safe location based on a selected travel route for the mobile machine. Then, movement of the mobile machine is initiated prior to a first estimated time when the selected travel route will be impassable due to the environmental parameters based on the estimated time of travel using the selected travel route from the current position of the mobile machine to the safe location.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Illustrative embodiments of the present invention provide a method, system, and computer usable program code for initiating movement of a vehicle based on environmental conditions that may be adversely impact the health and usability of the vehicle. At least one machine controller communicatively coupled to the mobile machine determines a safe location for the mobile machine based on environmental parameters corresponding to a current position of the mobile machine in response to a determination that the mobile machine needs to move to a new location based on the environmental parameters. The at least one controller calculates an estimated time of travel from the current position of the mobile machine to the safe location based on a selected travel route for the mobile machine.

Then, the at least one controller initiates movement of the mobile machine prior to a first estimated time when the mobile machine will be unusable and a second estimated time when the selected travel route will be impassable due to the environmental parameters based on the estimated time of travel using the selected travel route from the current position of the mobile machine to the safe location. In addition, the at least one controller calculates a third estimated time when all routes will be impassable from the current position of the mobile machine to any safe location due to the environmental parameters. The at least one controller initiates priority movement of the vehicle based on the third estimated time when all routes will be impassable from the current position of the vehicle to any safe location due to the environmental parameters.

Figure 1:
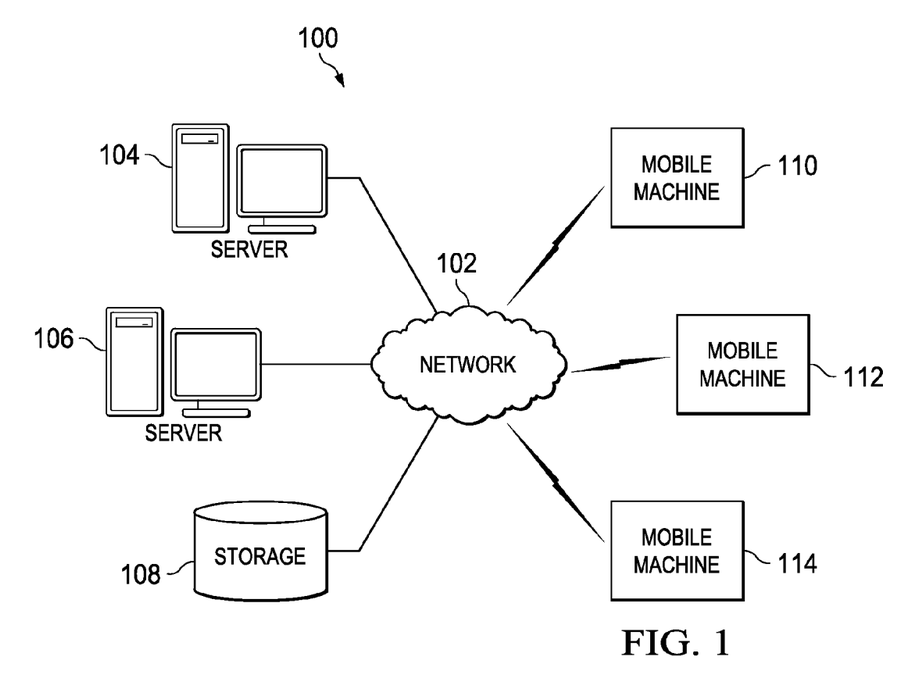
FIG. 1 is a diagram of a network of data processing systems in which an illustrative embodiment may be implemented.
Figure 2:
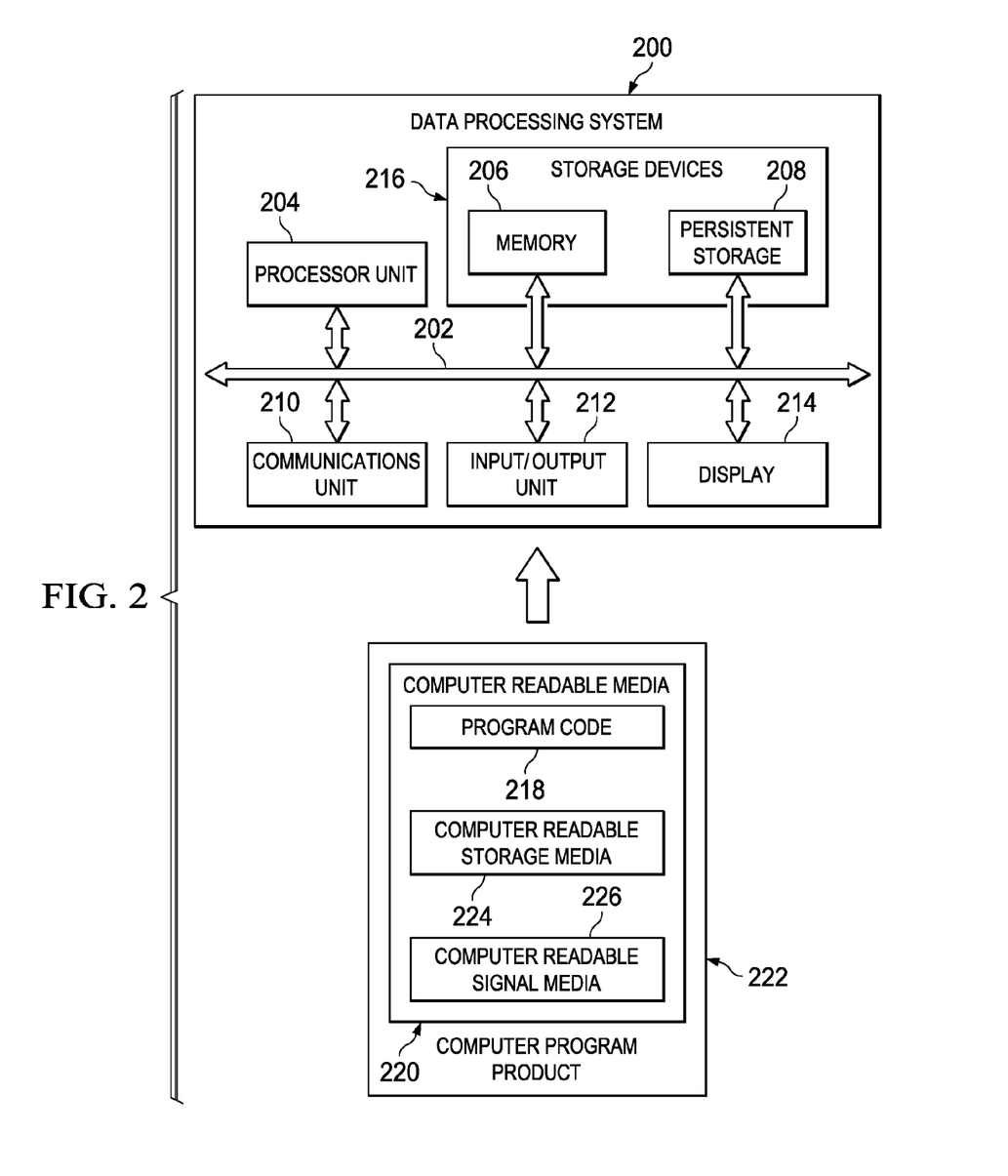
FIG. 2 is a block diagram of a data processing system in which an illustrative embodiment may be implemented.
Figure 3:
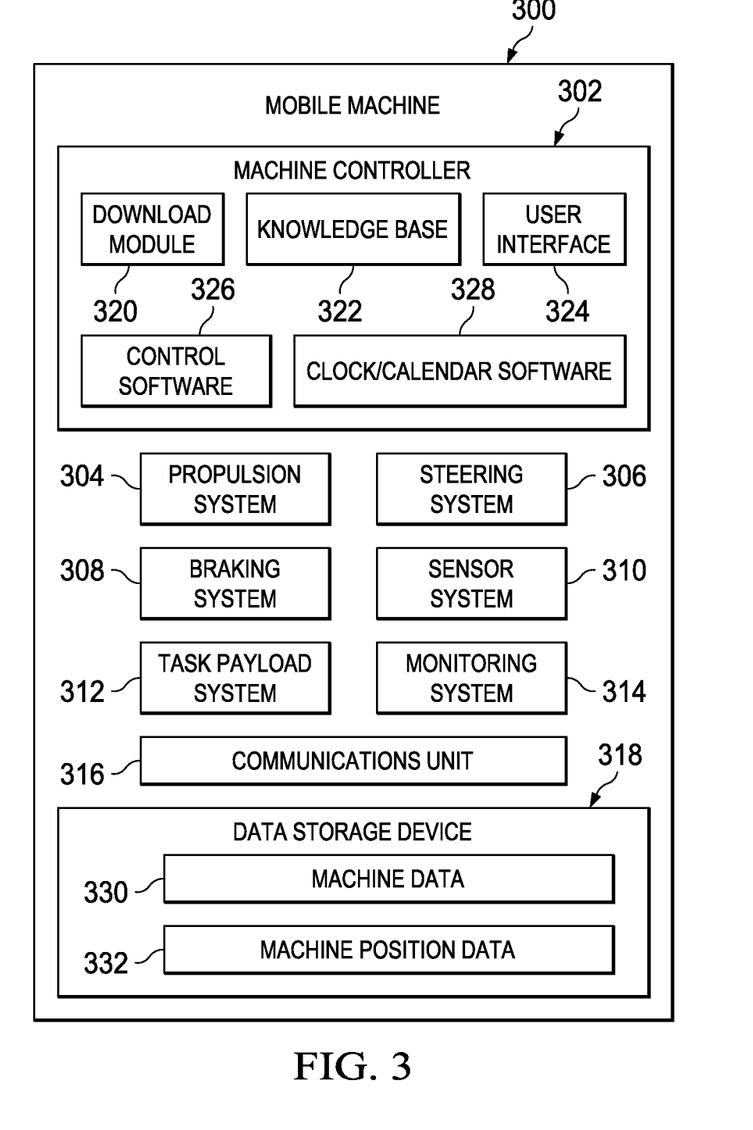
FIG. 3 is a block diagram of a mobile machine in accordance with an illustrative embodiment.

With reference now to the figures and in particular with reference to FIGS. 1-3, example diagrams of data processing environments are provided in which illustrative embodiments may be implemented. It should be appreciated that FIGS. 1-3 are only meant as examples and are not intended to assert or imply any limitation with regard to the environments in which different illustrative embodiments may be implemented. Many modifications to the depicted environments may be made.

FIG. 1 depicts a diagram of a network of data processing systems in which an illustrative embodiment may be implemented. Network data processing system 100 is a network of data processing systems and other devices in which the illustrative embodiments may be implemented. Network data processing system 100 contains network 102, which is the medium used to provide communications links between various data processing systems and other devices connected together within network data processing system 100. Network 102 may include connections, such as wire, wireless communication links, or fiber optic cables.

In the depicted example, server 104 and server 106 connect to network 102 along with storage unit 108. In addition, mobile machine 110, mobile machine 112, and mobile machine 114 also connect to network 102. Mobile machine 110, mobile machine 112, and mobile machine 114 are clients to server 104 and server 106 in this example.

Mobile machines 110, 112, and 114 represent vehicles that include data processing systems. A vehicle may, for example, include any type of car, truck, van, bus, train, agricultural vehicle, construction vehicle, or any other type of land vehicle. Examples of agricultural and construction vehicles may include any type of tractor, harvester, bulldozer, road grader, crane, or excavator. In addition, even though this example illustrates three mobile machines, illustrative embodiments are not restricted to such. In other words, illustrative embodiments may include more or fewer mobile machines connected to network 102. Further, mobile machines 110, 112, and 114 may each represent a fleet of the same type of vehicles or a fleet of different types of vehicles.

In the depicted example, server 104 and/or server 106 provide information, such as boot files, operating system images, and applications to mobile machine 110, mobile machine 112, and mobile machine 114. Also, network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to mobile machine system 110 over network 102 for use on mobile machine system 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN).

In addition, server 104 and server 106 may be servers located in a system of components that provide a telematics service. Telematics is a combination of the words telecommunication and informatics. Informatics, or information science, is the study of the processes involved in the collection, categorization, and distribution of data. A telematics service is one that provides information to a mobile source, such as mobile machine 110, mobile machine 112, and mobile machine 114.

The telematics service may, for example, consist of a network of regional, national, or global hardware and software components. In addition, the telematics service may be provided by a private enterprise, such as an independent third-party company that provides the service to other companies, a manufacturing company that provides the service to its customers, or a company that provides the service to its own fleet of vehicles. Alternatively, the telematics service may be provided by a governmental agency as a public service.

JDLink™ Machine Monitoring System is an example of an agricultural vehicle telematics service, which is available from John Deere & Company. As another example, OnStar® is a telematics service available from the General Motors Corporation. JDLink™ and OnStar® are examples of subscription telematics services that are provided to customers for a price.

The telematics service server, such as server 104, may provide information, such as, for example, position data, road map data, topographical map data, current and historic weather data, traffic data, road construction data, safety information, voice and text communication, vehicle diagnostic capabilities, and fuel source location data, to mobile machine 110, mobile machine 112, and mobile machine 114. In addition, the telematics service server may provide all necessary calculations for mobile machine 110, mobile machine 112, and mobile machine 114. For example, the telematics service server may determine a safe location for mobile machine 110 based on the weather conditions; select a preferred route of travel to the safe location based on the weather conditions; calculate an estimated time of travel to the safe location using the selected route of travel; calculate when mobile machine 110 may be rendered unusable or inoperable due to the weather conditions if mobile machine 110 does not change location; calculate when the selected route of travel may be rendered untraversable or impassable due to the weather conditions; and calculate when all routes to a safe location for mobile machine 110 may be impassable. A vehicle route or pathway may, for example, include any type of road or highway, a train track, or open country or terrain.

Further, the telematics service server may initiate movement of mobile machine 110 to the safe location prior to the estimated time when the vehicle will be unusable and the selected route of travel will be impassable due to the weather conditions. Initiating movement of mobile machine 110 may, for example, include the telematics service server signaling an operator of mobile machine 110 via an alert message to move the vehicle from its current position to the safe location. The alert message may, for example, be displayed on a display screen in mobile machine 110. Alternatively, the telematics service server may signal the operator by sending the alert message to a handheld wireless mobile device, such as a cellular telephone or personal digital assistant.

A safe location for mobile machine 110 is a place where the health of mobile machine 110 is not in danger due to environmental or weather conditions. For example, a safe location or position for mobile machine 110 may be a land position at a given elevation above flood stage of a river during a particular time of the year. The health of mobile machine 110 is the condition of mobile machine 110 based on monitoring, diagnostics, and prognostics. In other words, mobile machine 110 is in good health if mobile machine 110 is able to operate normally or in a typical manner.

Adverse environmental or weather conditions that may affect the health of mobile machine 110 may, for example, include high water levels, such as floods and tsunamis, increased snow depth due to high accumulations of snow, avalanche, ice accumulation caused by freezing precipitation, increased wind speeds, such as tornados, hurricanes, and typhoons, mud slides, rock slides, hail storms, volcanic ash, increased precipitation rates, and fire. In addition, non environmental or weather conditions may also affect the health of mobile machine 110. For example, a military event caused by war or political coup may place mobile machine 110 in jeopardy or a position of danger.

Moreover, the telematics service server may calculate the estimated time of travel to the safe location using the selected route of travel based on different parameters. The parameters may, for example, include a normal operating speed for mobile machine 110; a maximum operating speed for mobile machine 110; an impaired operating speed for mobile machine 110 due to bad weather, environmental, and/or road conditions, such as fog, dust, ash, smoke, road construction, high water, deep snow, or muddy conditions; an average expected traffic speed for mobile machine 110 between the current position of mobile machine 110 and the safe location; and time required to refuel mobile machine 110 during relocation.

In addition, prior to initiating movement of mobile machine 110, the telematics service server may schedule a preventive maintenance action for mobile machine 110 to increase the probability that mobile machine 110 will reach the safe location. The preventive maintenance action may be based on vehicle condition data obtained from mobile machine 110, itself, through diagnostic equipment onboard mobile machine 110. For example, the diagnostic equipment may indicate that a part on mobile machine 110, such as a link in a bulldozer track, is about to fail or has already failed. Furthermore, the telematics service may pre-position repair personnel and replacement parts needed for the preventive maintenance action at a selected site. Preventive maintenance as used herein may also include without limitation vehicle refueling and vehicle recharging. The selected site may, for example, be the current location of mobile machine 110 or a centralized location. Moreover, the preventive maintenance action may be scheduled for a plurality of vehicles at a same time.

Also, telematics service may include storage 108. Storage 108 represents any type of storage device that is capable of storing data in a structured or relational format. However, it should be noted that storage 108 may alternatively store data in an unstructured or object-oriented format as well. Also, storage 108 may represent a plurality of storage units connected to network 102.

The telematics service may use storage 108 to store vehicle specification data for a plurality of vehicles. Specification data may, for example, include vehicle types, engine types, fuel requirements, part lists, vehicle weights, two-wheel drives, four-wheel drives, track drives, and the like. The telematics service may use the vehicle specification data for making calculations.

The telematics service server may make the calculations by using a plurality of factors, such as, for example, global positioning system awareness, topographical awareness, destination awareness, weather awareness, and vehicle specification awareness. Of course, illustrative embodiments are not limited to the use of the above-listed factors. Illustrative embodiments may use more or fewer awareness factors to make the appropriate calculations to initiate movement of a vehicle.

Awareness means data input from a plurality of systems or sensors with regard to a respective awareness factor. Global positioning system awareness is location, elevation, direction, speed, and time data input for a vehicle. Topographical and destination awareness is data input regarding the topography or terrain around the vehicle.

Weather awareness is data input regarding the environmental conditions, such as, for example, rain, ice, snow, and heavy winds, around the vehicle. These weather conditions may negatively affect the health of the vehicle. The United States Weather Service may, for example, provide the weather awareness data to the vehicle through the telematics service. Alternatively, local, regional, national, or global weather services may provide the weather awareness data directly to the vehicle via wireless communication.

Vehicle specification awareness is data input regarding the design parameters of vehicle. Vehicle specification awareness data may, for example, be important in fuel consumption calculations. A manufacturer of the vehicle may provide the specification data.

Storage 108 may also store road maps, topographical maps, navigation data, weather information, traffic conditions, road construction sites, safety information, and communications. Furthermore, storage 108 may store any data, table, template, and/or algorithm necessary for illustrative embodiments to perform calculations to initiate movement of a vehicle based on environmental parameters. In addition, it should be noted that even though storage 108 is shown connected to network 102 in this particular illustration, storage 108 may be located, for example, within the vehicle, itself.

With reference now to FIG. 2, a block diagram of a data processing system is depicted in which an illustrative embodiment may be implemented. Data processing system 200 is an example of a data processing system in which computer usable program code or instructions implementing the processes of an illustrative embodiment may be located. Data processing system 200 may, for example, be implemented in a server, such as server 104 in FIG. 1. In addition, data processing system 200 may be located in a vehicle, such as mobile machine 110 in FIG. 1. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a transient basis and/or a persistent basis. Memory 206, in these examples, may, for example, be a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or other mobile machines. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference now to FIG. 3, a block diagram of a mobile machine is depicted in accordance with an illustrative embodiment. Mobile machine 300 may, for example, be mobile machine 110 in FIG. 1. However, it should be noted that mobile machine 300 is only intended as an example of one possible implementation of a mobile machine.

Mobile machine 300 may represent any type of land vehicle. Mobile machine 300 includes machine controller 302, propulsion system 304, steering system 306, braking system 308, sensor system 310, task payload system 312, monitoring system 314, communications unit 316, and data storage device 318. Machine controller 302 includes download module 320, knowledge base 322, user interface 324, control software 326, and clock/calendar software 328.

Machine controller 302 may, for example, be a data processing system, such as data processing system 200 in FIG. 2, or some other device that executes instructions or processes to control functions of mobile machine system 300. Thus, machine controller 302 may be a computer, an application integrated specific circuit, and/or some other suitable device. Furthermore, even though in this example machine controller 302 is shown as being located in mobile machine 300, machine controller 302 may be located in a remote data processing system, such as server 104 in FIG. 1 or in a mobile handheld device, such as a smart phone. Moreover, machine controller 302 may be distributed across a plurality of machine controllers located in a plurality of data processing systems. In other words, the processing of information necessary to implementation of illustrative embodiments may be distributed across a plurality of machine controllers, back office computers, and/or mobile devices. In addition, different types of devices and systems may be used to provide redundancy and fault tolerance.

Machine controller 302 executes processes using control software 326 to control certain aspects of propulsion system 304, steering system 306, braking system 308, and sensor system 310, which direct and control movement of mobile machine 300. Also, machine controller 302 may execute processes using control software 326 to control certain aspects of task payload system 312, which performs the work-oriented tasks of mobile machine 300, such as, for example, removing downed trees.

Furthermore, machine controller 302 may execute processes using control software 326 to control monitoring system 314, which monitors the functioning of the other system in mobile machine 300. Machine controller 302 may use this monitoring data to alert an operator of mobile machine 300 that a part or system in mobile machine 300 is about to fail or has already failed.

Machine controller 302 may send various commands to these components to operate mobile machine 300 in different modes of operation. These commands may take various forms depending on the implementation. For example, the commands may be analog electrical signals in which a voltage and/or current change is used to control these systems. In other implementations, the commands may take the form of data sent to the systems to initiate the desired functions or actions.

Download module 320 provides for online updates of knowledge base 322 by a network server, such as server 104 or server 106 in FIG. 1. In addition, download module 320 may also provide for online updates of current and future environmental data or factors from one or more local, regional, and national weather services.

Knowledge base 322 may, for example, include information about the operating environment surrounding mobile machine 300, such as, for example, a geo-referenced map showing the topography and a map showing roadway locations. In addition, knowledge base 322 may also include information, such as, without limitation, current weather for the operating environment; weather history for the operating environment; specific environmental conditions of the operating environment that may affect mobile machine 300; and the like. It should be noted that knowledge base 322 may be located entirely in mobile machine 300 or a portion or all of knowledge base 322 may be located in a remote location, such as storage 108 in FIG. 1, which mobile machine 300 may access via communications unit 316. Communications unit 316 may, for example, be communications unit 210 in FIG. 2.

User interface 324 may, in one illustrative embodiment, be implemented in a display device, such as display 214 in FIG. 2. User interface 324 may be mounted on mobile machine 300 and viewable by the operator. User interface 324 may, for example, display sensor data obtained from sensor system 310 regarding the operating environment surrounding mobile machine 300, as well as messages, alerts, and queries for the operator. In other illustrative embodiments, user interface 324 may be implemented in handheld wireless mobile device, such as a cellular telephone, to display information to the operator.

Clock/calendar software 328 is a software application that provides time and date information. In addition, clock/calendar software 328 is capable of receiving user inputs or network server inputs regarding seasonal environmental conditions within the operating environment of mobile machine 300. For example, machine controller 302 may use clock/calendar software 328 to determine seasons or times of the year when known environmental or weather conditions may affect mobile machine 300, such as spring flooding due to the melting of snow and ice.

In this example, propulsion system 304 propels or moves mobile machine 300. Propulsion system 304 may maintain, decrease, or increase the speed at which mobile machine 300 moves. Propulsion system 304 may be an electrically controlled propulsion system. In addition, propulsion system 304 may, for example, be a diesel engine, an internal combustion engine, an internal combustion engine/electric hybrid system, an electric engine, or some other suitable propulsion system.

Steering system 306 controls the direction or steering of mobile machine 300. Steering system 306 may, for example, be an electrically controlled hydraulic steering system, an electrically driven rack and pinion steering system, an Ackerman steering system, a skid-steer steering system, a differential steering system, or some other suitable steering system.

Braking system 308 slows down and/or stops mobile machine 300. Braking system 308 may be an electrically controlled braking system. In addition, braking system 308 may, for example, be a hydraulic braking system, a friction braking system, or some other suitable braking system that may be electrically controlled.

Sensor system 310 is a high integrity perception system and may be a set of sensors used to collect information about the operating environment around mobile machine 300. In this example, a set refers to one or more sensors. Sensor system 310 sends the collected information to machine controller 302 to provide data for identifying where mobile machine 300 is located and for identifying environmental parameters in the operating environment. For example, sensor system 310 may send data to machine controller 302 regarding the current location of mobile machine 300 and the current weather conditions surrounding mobile machine 300.

Communication unit 316 is a high integrity communications system and may provide multiple redundant communications links and channels to machine controller 302 in order for machine controller 302 to receive information. The communication links and channels may be heterogeneous and/or homogeneous redundant components that provide fail-safe communication. This received information may, for example, include data, commands, and/or instructions.

Communication unit 316 may take various forms. For example, communication unit 316 may include a wireless communications system, such as a cellular phone system, a wireless fidelity (Wi-Fi) technology system, a Bluetooth wireless technology system, and/or some other suitable wireless communications system. Further, communication unit 316 also may include a communications port, such as, for example, a universal serial bus port, a serial interface, a parallel port interface, a network interface, and/or some other suitable port to provide a physical communications link. Communication unit 316 may be used to communicate with the operator of mobile machine 300, another mobile machine, or a remote data processing system, such as a server.

Data storage device 318 may, for example, be persistent storage 208 in FIG. 2. Data storage device 318 stores machine data 330 and machine position data 332. Machine data 330 may, for example, be information regarding the vehicle specifications of mobile machine 300. Machine data 330 may also include information regarding monitored systems within mobile machine 300. Machine position data 332 may include information regarding the current position, as well as information regarding previous positions, of mobile machine 300.

The illustration of mobile machine 300 in FIG. 3 is not meant to imply physical or architectural limitations on the manner in which different advantageous embodiments may be implemented. Other components in addition to or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments knowledge base 322 may be separate and distinct from mobile machine 300, but capable of being used by mobile machine system 300.

Figure 4:
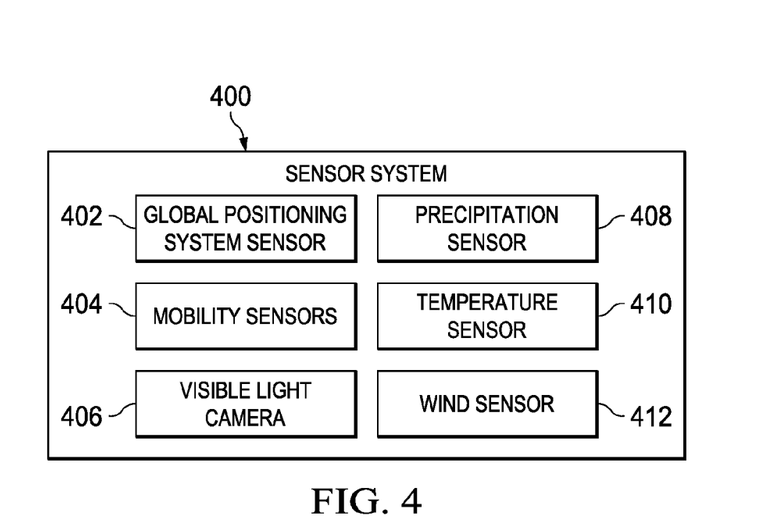
FIG. 4 is a block diagram of a sensor system in accordance with an illustrative embodiment.

With reference now to FIG. 4, a block diagram of a sensor system is depicted in accordance with an illustrative embodiment. Sensor system 400 is an example of one implementation of sensor system 310 in FIG. 3.

As illustrated, sensor system 400 includes global positioning system (GPS) sensor 402, mobility sensors 404, visible light camera 406, precipitation sensor 408, temperature sensor 410, and wind sensor 412. A machine controller, such as machine controller 302 in FIG. 3, may use these different sensors to identify conditions within the operating environment of a vehicle, such as mobile machine 300 in FIG. 3. The machine controller may select from these different sensors in sensor system 400 such that at least one of these sensors is always capable of sensing information needed to operate the mobile machine safely within the operating environment.

The machine controller may use global positioning system sensor 402 to calculate the current location, elevation, speed, direction, and time of the mobile machine. Global positioning system sensor 402 may be any type of radio frequency triangulation scheme based on signal strength and/or time of flight. Examples include, without limitation, the Global Positioning System, Glonass, Galileo, and cellular telephone tower relative signal strength. Position is typically reported as latitude and longitude with an error that depends on factors, such as condition of the ionosphere, satellite constellation, and signal attenuation from vegetation.

The machine controller may, for example, infer a loaded or unloaded status of the mobile machine with respect to a transport vehicle using global positioning system sensor 402. For example, if global positioning system sensor 402 indicates a current location of the mobile machine with an elevation of plus three feet, then the machine controller may infer that the mobile machine has been loaded on a trailer for transport. In addition, if global positioning system sensor 402 indicates a speed history of higher speeds than the mobile machine is capable of followed by no movement, then the machine controller may infer that the mobile machine has been transported and not yet unloaded at a new location.

The machine controller may use mobility sensors 414 to safely guide the mobile machine through the operating environment. Mobility sensors 414 may, for example, include an odometer, a compass for dead reckoning, vision and ultrasonic sensors for obstacle/object detection, and/or any other suitable sensor.

Visible light camera 406 may be a standard still-image camera, which may be used alone for color information or with a second camera to generate stereoscopic, or three-dimensional, images. When visible light camera 406 is used along with a second camera to generate stereoscopic images, the two or more cameras may be set with different exposure settings to provide improved performance over a range of lighting conditions.

Visible light camera 406 may also be a video camera that captures and records images. As a result, visible light camera 406 may be a component in a video-based object recognition system. The video-based object recognition system uses shape recognition to trigger alerts when a target is matched.

One capability provided by video system monitoring of the operating environment is environmental condition or threat detection. The machine controller may use the information regarding the detection of a threat to the mobile machine, such as high water levels, to initiate movement of the mobile machine. In addition, the machine controller may use this information to initiate an action, such as alerting the operator of the mobile machine via a message sent to a wireless handheld mobile device. Furthermore, the machine controller may communicate this information to other mobile machines operating in the area.

Precipitation sensor 408 detects precipitation, such as rain, snow, sleet, or hail, on an exterior surface of the mobile machine. In addition, precipitation sensor 408 may detect the amount of precipitation over time, which may indicate a threat to the mobile machine, such as flash flooding. Temperature sensor 410 detects the ambient temperature of the operating environment. Also, temperature sensor 410 may indicate rapid temperature changes over a short period of time, which may indicate the approach of fire or lava. Wind sensor 422 detects the wind velocity in the operating environment, which may also indicate the approach of a severe storm, such as tornadic activity.

In one illustrative embodiment, one or more of these sensors, such as temperature sensor 410 and wind sensor 412, may be optional features of sensor system 400. Also, a communications unit, such as communications unit 316 in FIG. 3, may transmit data obtained by one or more of these sensors to a telematics service server or an online database, such as, for example, server 106 or storage 108 in FIG. 1. Moreover, the machine controller may retrieve and coordinate data from two or more sensors in sensor system 400 to obtain different perspectives of the operating environment.

Figure 5:
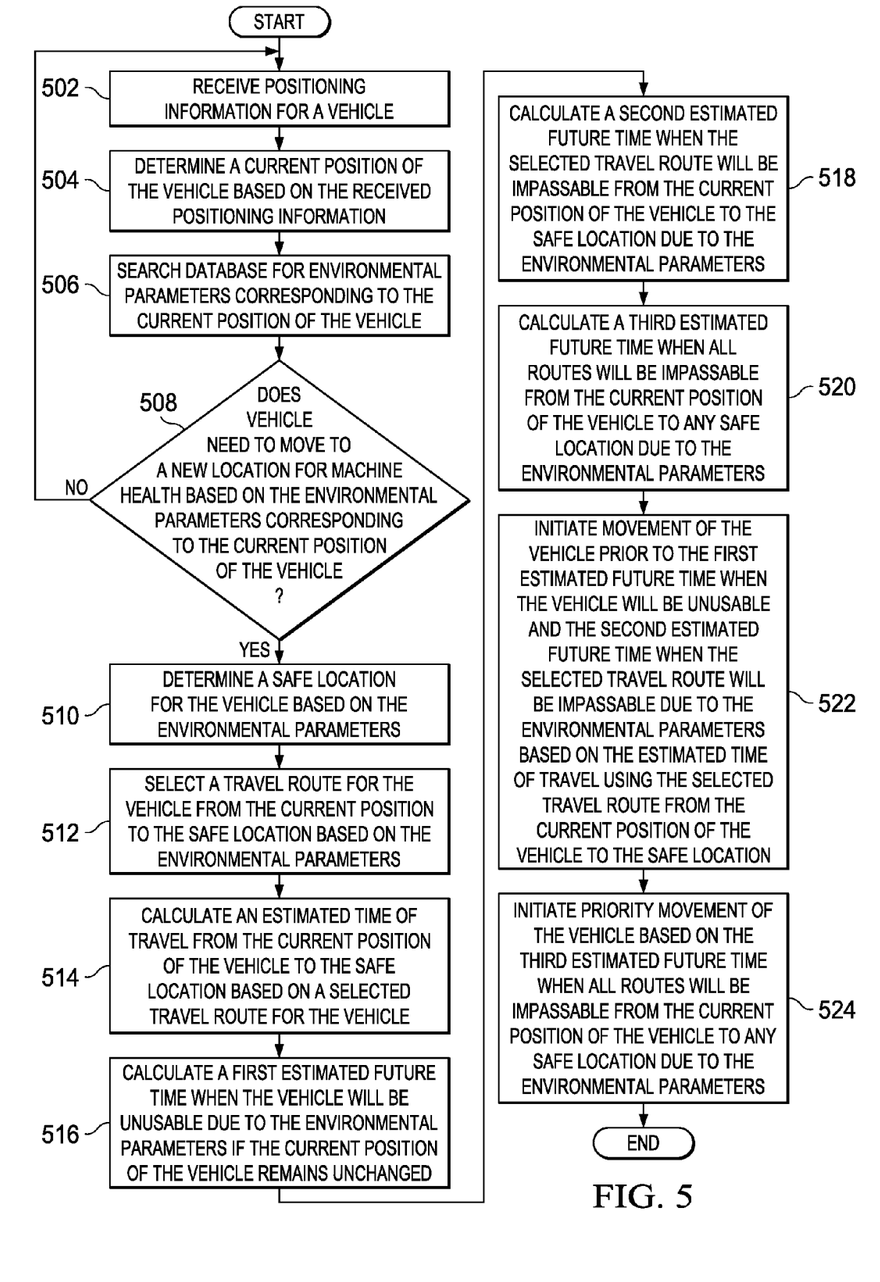
FIG. 5 is a flowchart illustrating an example process for initiating movement of a vehicle in accordance with an illustrative embodiment.

With reference now to FIG. 5, a flowchart illustrating an example process for initiating movement of a vehicle is shown in accordance with an illustrative embodiment. The process shown in FIG. 5 may be implemented in a server, such as server 104 in FIG. 1. Alternatively, the process may be implemented in a mobile machine, such as mobile machine 110 in FIG. 1 or mobile machine 300 in FIG. 3.

The process begins when the server receives positioning information for a vehicle (step 502). The positioning information may, for example, be obtained by the server from a positioning device, such as global positioning system sensor 402 in FIG. 4, located on the vehicle. After receiving the positioning information in step 502, the server determines a current position of the vehicle based on the received positioning information (step 504).

Then, the server searches a database, such as storage 108 in FIG. 1, for environmental parameters corresponding to the current position of the vehicle (step 506). The environmental parameters are current, historic, and/or predicted weather conditions in the area. A predicted weather or environmental condition may, for example, be high water levels along river banks due to flooding during a specific time of the year.

Subsequent to searching the database in step 506, the server makes a determination as to whether the vehicle needs to move to a new location for machine health based on the environmental parameters corresponding to the current position of the vehicle (step 508). If the server determines that the vehicle does not need to move to a new location for machine health based on the environmental parameters corresponding to the current position of the vehicle, no output of step 508, then the process returns to step 502 where the server continues to receive positioning information for the vehicle. If the server determines that the vehicle does need to move to a new location for machine health based on the environmental parameters corresponding to the current position of the vehicle, yes output of step 508, then the server determines a safe location for the vehicle based on the environmental parameters (step 510). A safe location for the vehicle may, for example, be a land position at an elevation above predicted river level during that time when flooding is predicted or is observed by a sensor system, such as sensor system 400 in FIG. 4, located on the vehicle.

Afterward, the server selects a travel route for the vehicle from the current position to the safe location based on the environmental parameters (step 512). The server may select a preferred route of travel for the vehicle using, for example, road maps, topographical maps, traffic information, road construction information, weather information, and vehicle specification data stored in the database. Subsequent to selecting the travel route in step 512, the server calculates an estimated time of travel from the current position of the vehicle to the safe location based on a selected travel route for the vehicle (step 514).

Further, the server calculates a first estimated future time when the vehicle will be unusable due to the environmental parameters if the current position of the vehicle remains unchanged (step 516). Furthermore, the server calculates a second estimated future time when the selected travel route will be impassable from the current position of the vehicle to the safe location due to the environmental parameters (step 518). Moreover, the server calculates a third estimated future time when all routes will be impassable from the current position of the vehicle to any safe location due to the environmental parameters (step 520).

Then, the server initiates movement of the vehicle prior to the first estimated future time when the vehicle will be unusable and the second estimated future time when the selected travel route will be impassable due to the environmental parameters based on the estimated time of travel using the selected travel route from the current position of the vehicle to the safe location (step 522). Initiating movement of the vehicle may, for example, include sending a message to the vehicle to alert the operator via a display device to move the vehicle to the safe location using the selected travel route. Afterward, the server initiates priority movement of the vehicle based on the third estimated future time when all routes will be impassable from the current position of the vehicle to any safe location due to the environmental parameters (step 524). The process terminates thereafter.

Thus, illustrative embodiments provide a method, system, and computer usable program code for initiating movement of a vehicle based on environmental conditions that may make the vehicle unusable or inoperative. The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method of initiating movement of a mobile machine, the method comprising:
   responsive to a determination that the mobile machine needs to move to a new location based on environmental parameters corresponding to a current position of the mobile machine, determining, by at least one controller communicatively coupled to the mobile machine, a safe location for the mobile machine based on the environmental parameters;
   calculating, by the at least one controller, an estimated time of travel from the current position of the mobile machine to the safe location based on a selected travel route for the mobile machine; and
   initiating, by the at least one controller, movement of the mobile machine prior to a first estimated time when the selected travel route will be impassable due to the environmental parameters based on the estimated time of travel using the selected travel route from the current position of the mobile machine to the safe location.

2. The method of claim 1 further comprising:
   calculating, by the at least one controller, a second estimated time when all routes will be impassable from the current position of the mobile machine to any safe location due to the environmental parameters; and
   initiating, by the at least one controller, priority movement of the vehicle based on the second estimated time when all routes will be impassable from the current position of the vehicle to any safe location due to the environmental parameters.

3. The method of claim 1 wherein the estimated time of travel from the current position of the mobile machine to the safe location is calculated based on at least one of an average traffic speed between the current position of the mobile machine and the safe location, a normal operating speed of the mobile machine, a maximum operating speed of the mobile machine, and an impaired operating speed of the mobile machine due to weather, environmental, and road conditions.

4. The method of claim 1 wherein the environmental parameters corresponding to the current position of the mobile machine that require the mobile machine to move to the safe location are at least one of flood water, snow depth, ice accumulation, wind speed, mud slide, rock slide, hail storm, volcanic ash, precipitation rate, and fire.

5. The method of claim 1 wherein the movement of the mobile machine is initiated by signaling an operator of the mobile machine.

6. The method of claim 1 wherein the movement of the mobile machine includes performing a preventive maintenance action based on monitored machine condition data for the mobile machine.

7. The method of claim 6 wherein repair personnel and replacement parts are pre-Positioned at a selected site to perform the preventive maintenance action based on the monitored machine condition data.

8. A data processing system for initiating movement of a mobile machine, the data processing system comprising:
   a bus system;
   a storage device connected to the bus system, wherein the storage device stores a set of instructions; and
   at least one processing unit connected to the bus system, wherein the at least one processing unit executes the set of instructions to determine a safe location for the mobile machine based on environmental parameters corresponding to a current position of the mobile machine in response to a determination that the mobile machine needs to move to a new location based on the environmental parameters; calculate an estimated time of travel from the current position of the mobile machine to the safe location based on a selected travel route for the mobile machine; and initiate movement of the mobile machine prior to a first estimated time when the selected travel route will be impassable due to the environmental parameters based on the estimated time of travel using the selected travel route from the current position of the mobile machine to the safe location.

9. The data processing system of claim 8 wherein the at least one processing unit executes a further set of instructions to calculate a second estimated time when all routes will be impassable from the current position of the mobile machine to any safe location due to the environmental parameters; and initiate priority movement of the vehicle based on the second estimated time when all routes will be impassable from the current position of the vehicle to any safe location due to the environmental parameters.

10. The data processing system of claim 8 wherein the estimated time of travel from the current position of the mobile machine to the safe location is calculated based on at least one of an average traffic speed between the current position of the mobile machine and the safe location, a normal operating speed of the mobile machine, a maximum operating speed of the mobile machine, and an impaired operating speed of the mobile machine due to weather, environmental, and road conditions.

11. The data processing system of claim 8 wherein the environmental parameters corresponding to the current position of the mobile machine that require the mobile machine to move to the safe location are at least one of flood water, snow depth, ice accumulation, wind speed, mud slide, rock slide, hail storm, volcanic ash, precipitation rate, and fire.

12. The data processing system of claim 8 wherein the movement of the mobile machine is initiated by signaling an operator of the mobile machine.

13. The data processing system of claim 8 wherein the movement of the mobile machine includes performing a preventive maintenance action based on monitored machine condition data for the mobile machine.

14. A computer program product including a computer usable storage medium having computer usable program code embodied thereon for initiating movement of a mobile machine, the computer program product comprising:

computer usable program code configured to determine a safe location for the mobile machine based on environmental parameters corresponding to a current position of the mobile machine in response to a determination that the mobile machine needs to move to a new location based on the environmental parameters;

computer usable program code configured to calculate an estimated time of travel from the current position of the mobile machine to the safe location based on a selected travel route for the mobile machine; and     computer usable program code configured to initiate movement of the mobile machine prior to a first estimated time when the selected travel route will be impassable due to the environmental parameters based on the estimated time of travel using the selected travel route from the current position of the mobile machine to the safe location.

15. The computer program product of claim 14 further comprising:

computer usable program code configured to calculate a second estimated time when all routes will be impassable from the current position of the mobile machine to any safe location due to the environmental parameters; and     computer usable program code configured to initiate priority movement of the vehicle based on the second estimated time when all routes will be impassable from the current position of the vehicle to any safe location due to the environmental parameters.

16. The computer program product of claim 14 wherein the estimated time of travel from the current position of the mobile machine to the safe location is calculated based on at least one of an average traffic speed between the current position of the mobile machine and the safe location, a normal operating speed of the mobile machine, a maximum operating speed of the mobile machine, and an impaired operating speed of the mobile machine due to weather, environmental, and road conditions.

17. The computer program product of claim 14 wherein the environmental parameters corresponding to the current position of the mobile machine that require the mobile machine to move to the safe location are at least one of flood water, snow depth, ice accumulation, wind speed, mud slide, rock slide, hail storm, volcanic ash, precipitation rate, and fire.

18. The computer program product of claim 14 wherein the movement of the mobile machine is initiated by signaling an operator of the mobile machine.

19. The computer program product of claim 14 wherein the movement of the mobile machine includes performing a preventive maintenance action based on monitored machine condition data for the mobile machine.

20. The computer program product of claim 19 wherein repair personnel and replacement parts are pre-positioned at a selected site to perform the preventive maintenance action based on the monitored machine condition data.

\* \* \* \* \*